United States Patent
Zou et al.

(10) Patent No.: US 10,803,326 B2
(45) Date of Patent: Oct. 13, 2020

(54) OBSTACLE DETECTING METHOD AND APPARATUS, DEVICE AND STORAGE MEDIUM

(71) Applicant: BAIDU ONLINE NETWORK TECHNOLOGY (BEIJING) CO., LTD., Beijing (CN)

(72) Inventors: Xiaoyi Zou, Beijing (CN); Dongming Chen, Beijing (CN); Hao Wang, Beijing (CN); Ji Wan, Beijing (CN); Tian Xia, Beijing (CN); Liang Wang, Beijing (CN); Shixi Chen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 280 days.

(21) Appl. No.: 15/915,002

(22) Filed: Mar. 7, 2018

(65) Prior Publication Data
US 2018/0260636 A1    Sep. 13, 2018

(30) Foreign Application Priority Data
Mar. 13, 2017    (CN) .......................... 2017 1 0146543

(51) Int. Cl.
*G06K 9/00*    (2006.01)
*G06T 7/521*    (2017.01)
(Continued)

(52) U.S. Cl.
CPC ........ *G06K 9/00805* (2013.01); *G01S 7/4808* (2013.01); *G01S 13/86* (2013.01);
(Continued)

(58) Field of Classification Search
CPC .......... G06K 9/00805; G06K 9/00201; G06K 9/6222; G01S 17/931; G01S 7/4808;
(Continued)

(56) References Cited

U.S. PATENT DOCUMENTS

| 9,315,192 B1* | 4/2016 | Zhu ...................... G06K 9/6217 |
| 9,400,501 B2 | 7/2016 | Schnittman |

(Continued)

FOREIGN PATENT DOCUMENTS

| CN | 102270301 A | 12/2011 |
| CN | 102779280 A | 11/2012 |

(Continued)

OTHER PUBLICATIONS

First Office Action and Search Report from CN201710146543.8, dated Sep. 3, 2019, with English translation from Global Dossier.

*Primary Examiner* — Siamak Harandi
(74) *Attorney, Agent, or Firm* — Ladas & Parry, LLP (57) ABSTRACT

The present disclosure provides an obstacle detecting method and apparatus, a device and a storage medium, wherein the method comprises: obtaining a 3D point cloud collected by an unmanned vehicle during travel; projecting the 3D point cloud on a 2-dimensional grid to respectively obtain feature information of each grid; inputting the feature information of each grid into a pre-trained prediction model to respectively obtain obstacle prediction parameters of each grid; performing grid clustering according to the obstacle prediction parameters of each grid to obtain obstacle detection results. The solutions of the present disclosure can be applied to improve the accuracy of detection results.

18 Claims, 3 Drawing Sheets

(51) Int. Cl.
*G01S 13/86* (2006.01)
*G06T 7/70* (2017.01)
*G01S 17/42* (2006.01)
*G01S 7/48* (2006.01)
*G06T 7/73* (2017.01)
*G01S 17/931* (2020.01)

(52) U.S. Cl.
CPC ............ *G01S 17/42* (2013.01); *G01S 17/931* (2020.01); *G06K 9/00201* (2013.01); *G06T 7/521* (2017.01); *G06T 7/70* (2017.01); *G06T 7/74* (2017.01); *G06T 2200/04* (2013.01); *G06T 2207/10016* (2013.01); *G06T 2207/10028* (2013.01); *G06T 2207/20081* (2013.01); *G06T 2207/20084* (2013.01); *G06T 2207/30261* (2013.01)

(58) Field of Classification Search
CPC . G01S 17/42; G01S 13/86; G06T 7/74; G06T 7/70; G06T 7/521; G06T 2207/10016; G06T 2200/04; G06T 2207/20084; G06T 2207/20081; G06T 2207/10028; G06T 2207/30261; A61B 3/112
See application file for complete search history.

(56) References Cited

U.S. PATENT DOCUMENTS

2016/0307052 A1 10/2016 Han et al.
2018/0018535 A1* 1/2018 Li ........................ G06K 9/4628

FOREIGN PATENT DOCUMENTS

| CN | 105957076 A | 9/2016 |
| CN | 105957145 A | 9/2016 |
| CN | 106052697 A | 10/2016 |
| CN | 106355194 A | 1/2017 |

* cited by examiner

OBSTACLE DETECTING METHOD AND APPARATUS, DEVICE AND STORAGE MEDIUM

The present application claims priority to Chinese Patent Application No. 201710146543.8, filed on Mar. 13, 2017, with the title of "Obstacle detecting method and apparatus, device and storage medium", the disclosure of which is hereby incorporated by reference in its entirety.

FIELD OF THE DISCLOSURE

The present disclosure relates to unmanned vehicle technology, and particularly to an obstacle detecting method and apparatus, a device and a storage medium.

BACKGROUND OF THE DISCLOSURE

An unmanned vehicle means sensing a surrounding environment of a vehicle through various sensors, and controlling a steering direction and a speed of the vehicle according to information about roads, vehicle positions and obstacles obtained by sensing, so that the vehicle can safely and reliably travel on the road.

A laser radar is an important sensor for the unmanned vehicle to sense a 3-dimensional environment. After scanning around a scenario, the laser radar returns a point cloud of the 3-dimensional space of the scenario, namely, 3D point cloud, including 3-dimensional coordinates of each point, laser reflection intensity and the like.

It is possible to, based on the collected 3D point cloud, perform detection (segmentation) of the obstacle and feed it back to a planning control system to perform an obstacle-avoiding operation. It can be seen that obstacle detection is directly related to the travel safety of the unmanned vehicle and is of very important significance. The obstacles may include pedestrians, motor vehicles, bicycles and the like appearing on the road.

In the prior art, detection of obstacles is performed mainly by using a rule-based algorithm, for example, based on a local region generating algorithm, i.e., generate through a "connection" operation by using one or more threshold values according to a local distance. However, this manner only relies on local space information, and an accuracy of the detection results is low.

SUMMARY OF THE DISCLOSURE

In view of the above, the present disclosure provides an obstacle detecting method and apparatus, a device and a storage medium, which can improve the accuracy of detection results.

Specific technical solutions are as follows:

An obstacle detecting method, comprising:

obtaining a 3D point cloud collected by an unmanned vehicle during travel;

projecting the 3D point cloud on a 2-dimensional grid to respectively obtain feature information of each grid;

inputting the feature information of each grid into a pre-trained prediction model to respectively obtain obstacle prediction parameters of each grid;

performing grid clustering according to the obstacle prediction parameters of each grid to obtain obstacle detection results.

An obstacle detecting apparatus, comprising: an obtaining unit and a detecting unit;

the obtaining unit configured to obtain a 3D point cloud collected by an unmanned vehicle during travel and send the 3D point cloud to the detecting unit;

the detecting unit configured to project the 3D point cloud on a 2-dimensional grid to respectively obtain feature information of each grid; input the feature information of each grid into a pre-trained prediction model to respectively obtain obstacle prediction parameters of each grid; perform grid clustering according to the obstacle prediction parameters of each grid to obtain obstacle detection results.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, the solutions of the present disclosure may be employed to project the obtained 3D point cloud on a 2-dimensional grid to respectively obtain feature information of each grid; input the feature information of each grid into the prediction model to respectively obtain obstacle prediction parameters of each grid, and thereby perform grid clustering according to the obstacle prediction parameters of each grid to obtain obstacle detection results. As compared with the prior art, the solutions of the present disclosure no longer only depend on local space information, and thereby improve the accuracy of the detection results.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Figure 1:
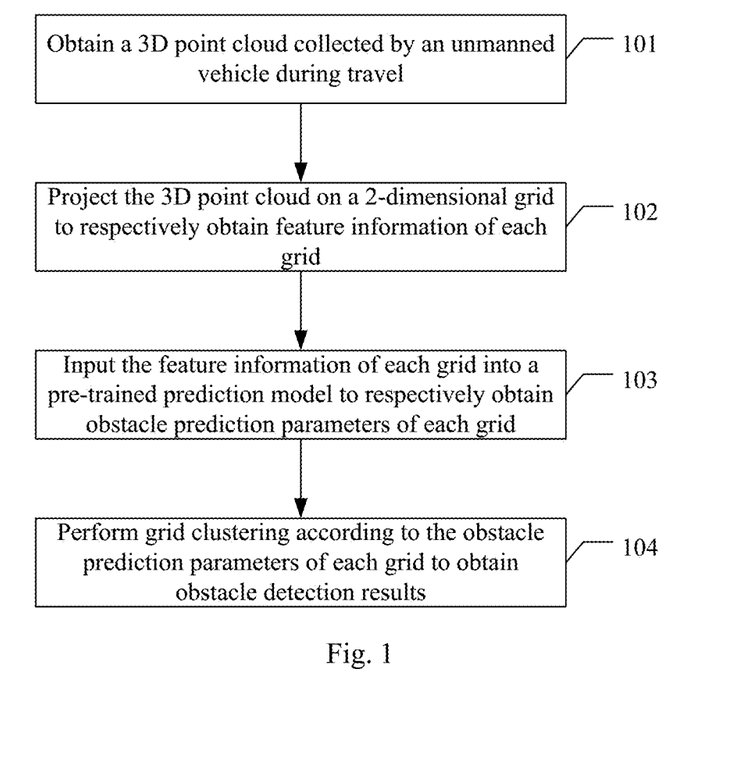
FIG. 1 is a flow chart of an embodiment of an obstacle detecting method according to the present disclosure.
Figure 2:
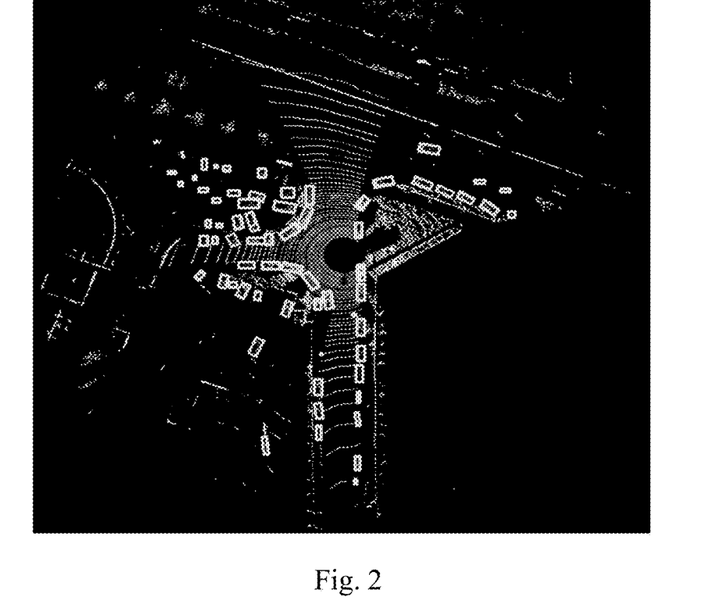
FIG. 2 is a schematic diagram of obstacles obtained based on the obstacle detecting method of the present disclosure.

FIG. 1 is a flow chart of an embodiment of an obstacle detecting method according to the present disclosure. As shown in FIG. 2, the embodiment comprises the following specific implementation mode:

At 101 is obtained a 3D point cloud collected by an unmanned vehicle during travel;

At 102, the obtained 3D point cloud is projected on a 2-dimensional grid to respectively obtain feature information of each grid;

At 103, the feature information of each grid is input into a pre-trained prediction model to respectively obtain obstacle prediction parameters of each grid;

At 104 is performed grid clustering according to the obstacle prediction parameters of each grid to obtain obstacle detection results.

During the travel of the unmanned vehicle, a laser radar collects data constantly. After the 3D point cloud returned by the laser radar is obtained each time, processing is performed in the manner of the above 102-104, i.e., detection of obstacles is performed.

Specific implementation of the above portions will be respectively described below in detail.

1) Projection and Feature Extraction

The procedure of projection and feature extraction may be called pre-processing procedure.

It is feasible to project the obtained 3D point cloud on a birdview (top view), namely, perform 2-dimensional grid processing for the 3D point cloud, and project it on a 2-dimensional grid. The specific number of grids may be set according to actual needs. For example, the 3D point cloud within a range of 60 meters may be projected on a planar grid which is 640 long and 640 wide so that a point cloud set belonging to each grid may be obtained. The number of points in point cloud sets of different grids might be the same or different.

Then, feature statistics may be performed respectively for each grid to respectively obtain the feature information of each grid.

Which features undergo the statistics specifically may be decided according to actual needs, for example, it is possible to, for each grid, respectively perform statistics for the number of points in the grid, a maximum height and an average height of points in the grid, and the like.

Assume there exist totally 640*640 grids and eight features are obtained from statistic of each grid, totally 640*640*8 features may be obtained.

2) Prediction Model and Prediction Parameters

The prediction model may be obtained through pre-training. Preferably, the prediction model may be a convolutional neural network model.

To this end, a batch of training samples needs to be obtained first.

For example, a training sample may be generated after the 3D point cloud is obtained each time. Specifically, it is possible to obtain the feature information of each grid in the manner stated in the above 1), as input in the training sample, and furthermore, obtain output of the training sample through an obstacle 3-dimensional block obtained by manual marking, including: a probability that each grid belongs to an obstacle, and an amount of deviation of each grid pointing to a central position of the obstacle to which the grid belongs.

After a sufficient number of training samples are obtained, parameters of the convolutional neural network may be trained according to these training samples to obtain optimal convolutional neural network parameters, namely, obtain a desired convolutional neural network model.

During actual detection, after the 3D point cloud is obtained each time, and the 3D point cloud is projected on the 2-dimensional grid to respectively obtain the feature information of each grid, the feature information of all grids may be input together into the convolutional neural network model to respectively obtain the obstacle prediction parameters of each grid.

The obstacle prediction parameters may comprise a first parameter and a second parameter. As for each grid, the first parameter may be: a probability that the grid belongs to an obstacle, and second parameter may be: an amount of deviation of the grid pointing to a central position of the obstacle to which the grid belongs.

The probability may be in a range of [0, 1].

3) Clustering

After the obstacle prediction parameters of all grids are obtained respectively, grid clustering may be performed according to the obstacle prediction parameters of all grids to thereby obtain obstacle detection results.

Specifically, first, it is possible to compare the first parameter of each grid with a preset first threshold to screen out grids whose first parameter is larger than the first threshold.

Then, central positions of all possible obstacles may be determined according to the second parameter of each grid. Since the second parameter is an amount of deviation of the grid pointing to the central position of the obstacle to which the grid belongs, it is feasible to determine central positions of all possible obstacles according to the amount of deviation of each grid, and further screen out central positions whose credibility is greater than a preset second threshold, for example, screen out the central positions whose credibility is greater than the second threshold through non-maximum suppression.

Then, it is feasible to perform clustering for the screened-out grids according to the screened-out central positions, and consider obtained classes as the obstacle detection results.

That is to say, it is feasible to consider the screened-out central positions as a clustering center, and perform clustering for the screened-out grids according to the amount of deviation of the screened-out grids pointing to central position of the obstacle to which the grids belong, to thereby obtain an initial obstacle instance. Specific implementation is of the prior art.

On this basis, processing may be further performed in one or all of the following manners:

1) performing obstacle merging according to a proximity relationship between the obstacles;

For example, it is possible to perform merging for obstacles whose proximity relationship meets a merging requirement, thereby removing fragmentary obstacles to avoid occurrence of excessive segmentation phenomenon. Specific content of the merging requirement may depend on actual needs;

2) filling grids which are among grids not screened out and meet a filling requirement, to corresponding positions of the obstacles to which the grids belong;

For example, as for an obstacle, whether to fill grids may be determined according to a contrast relationship of a central grid and edge grids among grids forming the obstacle. Usually, in most cases, the contrast between grids forming one obstacle should gradually change. In the event of occurrence of a jump, thoughts may be given to whether to fill a grid, i.e., the grid is selected from those grids previously not screened out, and determination is made as to whether there exists a grid that belongs to the obstacle and can remedy the above jump. If there exists such grid, the grid is filled to a corresponding position in the obstacle.

4) Post-Processing on the 3D Point Cloud

The obstacle detection results in the 2D space are obtained in the previous processing manner. Preferably, it is further necessary to back-project it to the 3D space, that is, after performing clustering for the screened-out grids and considering the obtained classes as the obstacle detection results, it is further necessary to back-project each class on the 3D point cloud. Specific implementation is of the prior art.

In practical application, it often occurs that trees or other things block the obstacle. In this case, the obstacle cannot be well detected in the above 1)-3) manners, and post-processing needs to be further performed.

The post-processing manner may comprise:

1) respectively performing the following processing for each class after the back-projection:

estimating a ground surface height, and if a fault appears above the ground surface height, sectioning, and considering a portion located above the ground surface height and below the fault as an obstacle;

That is to say, if a larger fault appears above the ground surface height, sectioning is performed from here, sectioning is not needed in the event of continuity, and then the portion located above the ground surface height and below the fault may be considered as the detected obstacle.

2) respectively performing the following processing for each class after the back-projection:

sorting points in the class in order of height, sectioning if a height difference between two neighboring points is larger than a preset third threshold, finding a section with the largest number of points, and determining an obstacle according to points in the section;

That is to say, according to heights of points, sorting the points in the class in a descending order or an ascending order of height, then comparing the height difference between neighboring points, sectioning from here if the height difference is larger than the third threshold, finally finding a section with the larger number of points, and segmenting out the section.

In practical application, any of the above post-processing manners may be selected arbitrarily.

In addition, except for the issue that the obstacle is blocked by trees, some obstacles with larger difficulty might miss in the manners stated in 1)-3), for example, since points of a remote obstacle are too sparse or the obstacle is partially blocked, the obstacle might miss the detection.

To this end, the present disclosure proposes, as for grids not screened out in the above 3), performing obstacle detection by using a current rule-based algorithm in the 3D space, thereby minimizing occurrence of miss-detection phenomenon of the obstacle and thereby further improving the accuracy of the detection results.

Specific values of respective thresholds involved in the above procedure may depend on actual needs.

FIG. 2 is a schematic diagram of obstacles obtained based on the obstacle detecting method of the present disclosure.

The above introduces the method embodiment. The solution of the present disclosure will be further described through an apparatus embodiment.

Figure 3:
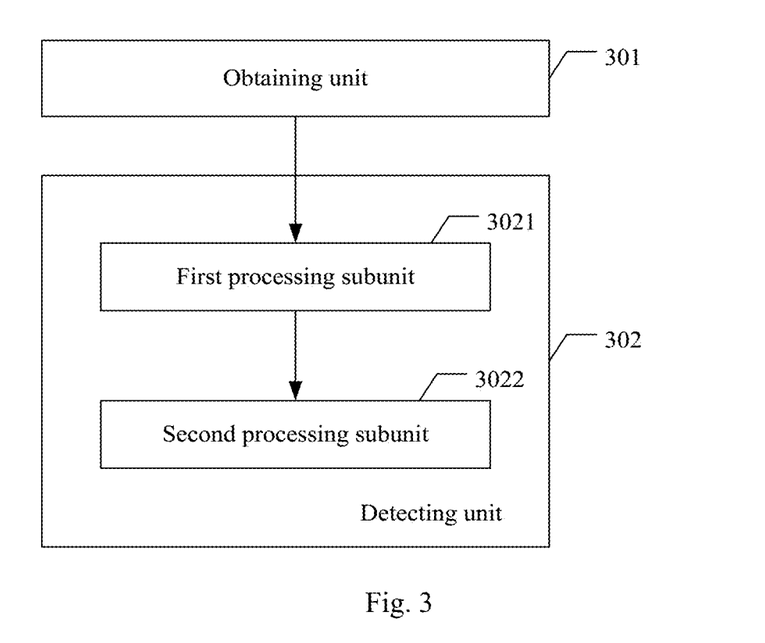
FIG. 3 is a structural schematic diagram of components of an obstacle detecting apparatus according to an embodiment of the present disclosure.

FIG. 3 is a structural schematic diagram of components of an obstacle detecting apparatus according to an embodiment of the present disclosure. As shown in FIG. 3, the apparatus comprises: an obtaining unit 301 and a detecting unit 302.

The obtaining unit 301 is configured to obtain a 3D point cloud collected by an unmanned vehicle during travel and send the 3D point cloud to the detecting unit 302.

The detecting unit 302 is configured to project the 3D point cloud on a 2-dimensional grid to respectively obtain feature information of each grid; input the feature information of each grid into a pre-trained prediction model to respectively obtain obstacle prediction parameters of each grid; perform grid clustering according to the obstacle prediction parameters of each grid to obtain obstacle detection results.

During the travel of the unmanned vehicle, a laser radar collects data constantly. After obtaining the 3D point cloud returned by the laser radar each time, the obtaining unit 301 may send the 3D point cloud to the detecting unit 302 so that the detecting unit 302 performs detection of the obstacle.

As shown in FIG. 3, the detecting unit 302 may further comprise: a first processing subunit 3021 and a second processing subunit 3022.

The first processing subunit 3021 is configured to project the 3D point cloud on a 2-dimensional grid to respectively obtain feature information of each grid, input the feature information of each grid into a pre-trained prediction model to respectively obtain obstacle prediction parameters of each grid, and send the obstacle prediction parameters to the second processing subunit 3022.

The first processing subunit 3021 may perform 2-dimensional grid processing for the obtained 3D point cloud, i.e., project the 3D point cloud on a 2-dimensional grid, and then perform feature statistics respectively for each grid to respectively obtain the feature information of each grid.

Which features undergo the statistics specifically may be decided according to actual needs, for example, it is possible to, for each grid, respectively perform statistics for the number of points in the grid, a maximum height and an average height of points in the grid, and the like.

A prediction model may be obtained by pre-training according to the obtained training sample. Preferably, the prediction model is a convolutional neural network model.

As such, the first processing subunit 3021 may input the feature information of all grids together into the convolutional neural network model to respectively obtain the obstacle prediction parameters of each grid.

The obstacle prediction parameters may comprise a first parameter and a second parameter. As for each grid, the first parameter may be: a probability that the grid belongs to an obstacle, and second parameter may be: an amount of deviation of the grid pointing to a central position of the obstacle to which the grid belongs.

The second processing subunit 3022 may compare the first parameter of each grid with a preset first threshold to screen out grids whose first parameter is larger than the first threshold, determine central positions of all possible obstacles according to the second parameter of each grid, and further screen out central positions whose credibility is greater than a preset second threshold, perform clustering for the screened-out grids according to the screened-out central positions, and consider obtained classes as the obstacle detection results.

On this basis, the second processing subunit 3022 may further perform processing in one or all of the following manners:

1) performing obstacle merging according to a proximity relationship between the obstacles;

2) filling grids which are among grids not screened out and meet a filling requirement, to corresponding positions of the obstacles to which the grids belong.

The obstacle detection results in the 2D space are obtained in the previous processing manner. Preferably, it is further necessary to back-project it to the 3D space, that is, the second processing subunit 3022 further needs to back-project each obtained class on the 3D point cloud.

In addition, to further improve the accuracy of the detection results, the second processing subunit 3022 may further perform post-processing for each class after the back-projection in one of the following manners:

1) estimating a ground surface height for each class after the back-projection, and if a fault appears above the ground surface height, sectioning, and considering a portion located above the ground surface height and below the fault as an obstacle;

2) as for each class after the back-projection, respectively sorting points in the class in order of height, sectioning if a height difference between two neighboring points is larger than a third threshold, finding a section with the largest number of points, and determining an obstacle according to points in the section.

A specific workflow of the apparatus embodiment shown in FIG. 3 will not be detail any more here, and reference may be made to corresponding depictions in the above method embodiment.

Figure 4:
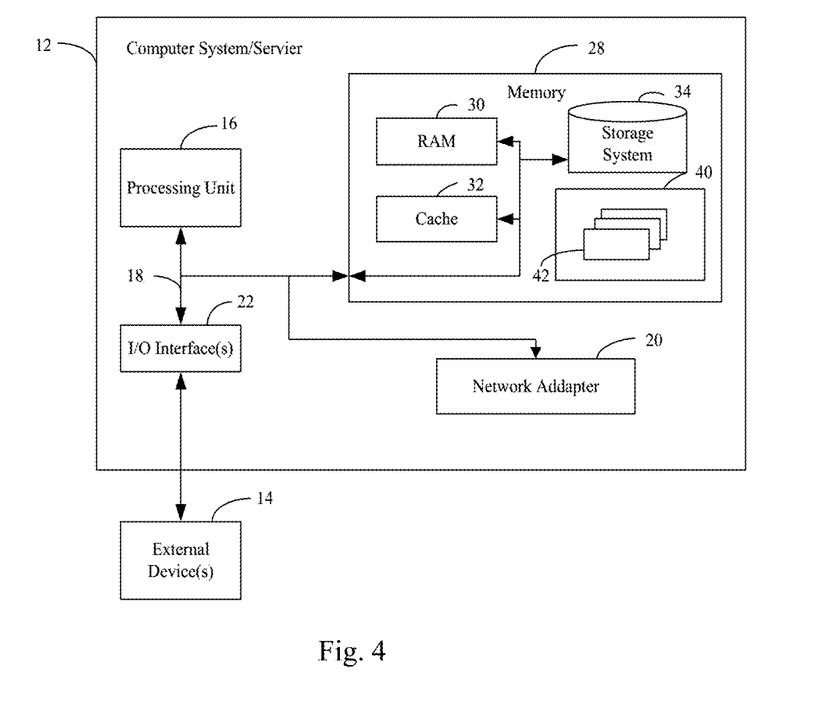
FIG. 4 illustrates a block diagram of an example computer system/server 12 adapted to implement an implementation mode of the present disclosure.

FIG. 4 illustrates a block diagram of an example computer system/server 12 adapted to implement an implementation mode of the present disclosure. The computer system/server 12 shown in FIG. 4 is only an example and should not bring about any limitation to the function and scope of use of the embodiments of the present disclosure.

As shown in FIG. 4, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 4, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 1, namely, obtain a 3D point cloud collected by an unmanned vehicle during travel, project the obtained 3D point cloud on a 2-dimensional grid to respectively obtain feature information of each grid, input the feature information of each grid into a pre-trained prediction model to respectively obtain obstacle prediction parameters of each grid, and perform grid clustering according to the obstacle prediction parameters of each grid to obtain obstacle detection results.

Then, it is feasible to respectively back-project the obtained each class on the 3D point cloud, and perform post-processing for each class after the back-projection.

For example, the following processing is respectively performed for each class after the back-projection: estimating a ground surface height for each class after the back-projection, and if a fault appears above the ground surface height, sectioning, and considering a portion located above the ground surface height and below the fault as an obstacle.

Again for example, the following processing is respectively performed for each class after the back-projection: respectively sorting points in the class in order of height, sectioning if a height difference between two neighboring points is larger than a third threshold, finding a section with the largest number of points, and determining an obstacle according to points in the section.

The present disclosure further provides a computer-readable storage medium on which a computer program is stored. The program, when executed by a processor, can implement the method in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. An obstacle detecting method, wherein the method comprises:
    obtaining a 3D point cloud collected by an unmanned vehicle during travel;
    projecting the 3D point cloud on a 2-dimensional grid to respectively obtain feature information of each grid;
    inputting the feature information of each grid into a pre-trained prediction model to respectively obtain obstacle prediction parameters of each grid;
    performing grid clustering according to the obstacle prediction parameters of each grid to obtain obstacle detection results,
    wherein the obstacle prediction parameters of each grid comprise a first parameter and a second parameter;
    the first parameter comprises a probability that the grid belongs to an obstacle; and
    the second parameter comprises an amount of deviation of the grid pointing to a central position of the obstacle to which the grid belongs.

2. The method according to claim 1, wherein
    the prediction model comprises a convolutional neural network model.

3. The method according to claim 1, wherein
    the performing grid clustering according to the obstacle prediction parameters of each grid to obtain obstacle detection results comprises:
    comparing the first parameter of each grid with a preset first threshold to screen out grids whose first parameter is larger than the first threshold;
    determining central positions of all possible obstacles according to the second parameter of each grid, and screening out central positions whose credibility is larger than a preset second threshold;
    performing clustering for the screened-out grids according to the screened-out central positions, and considering obtained classes as the obstacle detection results.

4. The method according to claim 3, wherein
    after considering obtained classes as the obstacle detection results, the method further comprises:
    performing obstacle merging according to a proximity relationship between the obstacles.

5. The method according to claim 3, wherein
    after considering obtained classes as the obstacle detection results, the method further comprises:
    filling grids which are among grids not screened out and meet a filling requirement, to corresponding positions of the obstacles to which the grids belong.

6. The method according to claim 3, wherein
    after considering obtained classes as the obstacle detection results, the method further comprises:
    respectively back-projecting the obtained each class on the 3D point cloud;
    performing the following processing respectively for each class after the back-projection:
    estimating a ground surface height, and if a fault appears above the ground surface height, sectioning, and considering a portion located above the ground surface height and below the fault as an obstacle; or
    respectively sorting points in the class in order of height, sectioning if a height difference between two neighboring points is larger than a third threshold, finding a section with the largest number of points, and determining an obstacle according to points in the section.

7. A computer device, comprising a memory, a processor and a computer program which is stored on the memory and runs on the processor, wherein the processor, upon executing the program, implements the following operation:

obtaining a 3D point cloud collected by an unmanned vehicle during travel;

projecting the 3D point cloud on a 2-dimensional grid to respectively obtain feature information of each grid;

inputting the feature information of each grid into a pre-trained prediction model to respectively obtain obstacle prediction parameters of each grid;

performing grid clustering according to the obstacle prediction parameters of each grid to obtain obstacle detection results, wherein the obstacle prediction parameters of each grid comprise a first parameter and a second parameter;

the first parameter comprises a probability that the grid belongs to an obstacle; and the second parameter comprises an amount of deviation of the grid pointing to a central position of the obstacle to which the grid belongs.

8. A non-transitory computer-readable storage medium on which a computer program is stored, wherein the program, when executed by the processor, implements the following operation:

obtaining a 3D point cloud collected by an unmanned vehicle during travel;

projecting the 3D point cloud on a 2-dimensional grid to respectively obtain feature information of each grid;

inputting the feature information of each grid into a pre-trained prediction model to respectively obtain obstacle prediction parameters of each grid;

performing grid clustering according to the obstacle prediction parameters of each grid to obtain obstacle detection results, wherein the obstacle prediction parameters of each grid comprise a first parameter and a second parameter;

the first parameter comprises a probability that the grid belongs to an obstacle; and the second parameter comprises an amount of deviation of the grid pointing to a central position of the obstacle to which the grid belongs.

9. The computer device according to claim 7, wherein the prediction model comprises a convolutional neural network model.

10. The computer device according to claim 7, wherein the performing grid clustering according to the obstacle prediction parameters of each grid to obtain obstacle detection results comprises:

comparing the first parameter of each grid with a preset first threshold to screen out grids whose first parameter is larger than the first threshold;

determining central positions of all possible obstacles according to the second parameter of each grid, and screening out central positions whose credibility is larger than a preset second threshold;

performing clustering for the screened-out grids according to the screened-out central positions, and considering obtained classes as the obstacle detection results.

11. The computer device according to claim 10, wherein after considering obtained classes as the obstacle detection results, the operation further comprises:

performing obstacle merging according to a proximity relationship between the obstacles.

12. The computer device according to claim 10, wherein after considering obtained classes as the obstacle detection results, the operation further comprises:

filling grids which are among grids not screened out and meet a filling requirement, to corresponding positions of the obstacles to which the grids belong.

13. The computer device according to claim 10, wherein after considering obtained classes as the obstacle detection results, the operation further comprises:

respectively back-projecting the obtained each class on the 3D point cloud;

performing the following processing respectively for each class after the back-projection:

estimating a ground surface height, and if a fault appears above the ground surface height, sectioning, and considering a portion located above the ground surface height and below the fault as an obstacle; or respectively sorting points in the class in order of height, sectioning if a height difference between two neighboring points is larger than a third threshold, finding a section with the largest number of points, and determining an obstacle according to points in the section.

14. The non-transitory computer-readable storage medium according to claim 8, wherein
the prediction model comprises a convolutional neural network model.

15. The non-transitory computer-readable storage medium according to claim 8, wherein
the performing grid clustering according to the obstacle prediction parameters of each grid to obtain obstacle detection results comprises:

comparing the first parameter of each grid with a preset first threshold to screen out grids whose first parameter is larger than the first threshold;

determining central positions of all possible obstacles according to the second parameter of each grid, and screening out central positions whose credibility is larger than a preset second threshold;

performing clustering for the screened-out grids according to the screened-out central positions, and considering obtained classes as the obstacle detection results.

16. The non-transitory computer-readable storage medium according to claim 15, wherein
after considering obtained classes as the obstacle detection results, the operation further comprises:

performing obstacle merging according to a proximity relationship between the obstacles.

17. The non-transitory computer-readable storage medium according to claim 15, wherein
after considering obtained classes as the obstacle detection results, the operation further comprises:

filling grids which are among grids not screened out and meet a filling requirement, to corresponding positions of the obstacles to which the grids belong.

18. The non-transitory computer-readable storage medium according to claim 15, wherein
after considering obtained classes as the obstacle detection results, the operation further comprises:

respectively back-projecting the obtained each class on the 3D point cloud;

performing the following processing respectively for each class after the back-projection:

estimating a ground surface height, and if a fault appears above the ground surface height, sectioning, and considering a portion located above the ground surface height and below the fault as an obstacle; or respectively sorting points in the class in order of height, sectioning if a height difference between two neighboring points is larger than a third threshold, finding a section with the largest number of points, and determining an obstacle according to points in the section.

* * * * *